(12) United States Patent
Wan (10) Patent No.: US 8,788,602 B1
(45) Date of Patent: Jul. 22, 2014

(54) METHOD AND SYSTEM FOR PROVIDING NOTIFICATIONS FOR SPECIFIC MESSAGES

(75) Inventor: Justin Charles Wan, New York, NY (US)

(73) Assignee: Google Inc., Mountain View, CA (US)

( * ) Notice: Subject to any disclaimer, the term of this patent is extended or adjusted under 35 U.S.C. 154(b) by 197 days.

(21) Appl. No.: 13/230,792

(22) Filed: Sep. 12, 2011

(51) Int. Cl.
*G06F 15/16* (2006.01)

(52) U.S. Cl.
USPC .......................................... 709/206; 709/224

(58) Field of Classification Search
USPC .................................. 709/206, 203, 224, 200
See application file for complete search history.

(56) References Cited

U.S. PATENT DOCUMENTS

| | | | |
|---|---|---|---|
| 7,519,676 B2 | 4/2009 | Horvitz et al. | |
| 7,587,461 B2 | 9/2009 | Baluja et al. | |
| 8,086,672 B2 * | 12/2011 | Horvitz | 709/206 |
| 2003/0143983 A1 | 7/2003 | Crampton | |
| 2004/0254998 A1 * | 12/2004 | Horvitz | 709/206 |
| 2005/0223057 A1 | 10/2005 | Buchheit et al. | |
| 2005/0223066 A1 | 10/2005 | Buchheit et al. | |
| 2007/0021108 A1 | 1/2007 | Bocking et al. | |
| 2010/0162264 A1 * | 6/2010 | Allen et al. | 719/313 |
| 2011/0055058 A1 * | 3/2011 | Hammad et al. | 705/30 |

* cited by examiner

*Primary Examiner* — El Hadji Sall
(74) *Attorney, Agent, or Firm* — McDermott Will & Emery LLP (57) ABSTRACT

Systems, methods, and machine-readable media for providing notifications for specific messages addressed to a recipient is provided. The system may include an interface module, a notification rules module, and a notification module. The interface module may be configured to receive a selection of an option that enables notifications for specific messages addressed to the recipient. The notification rules module may be configured to determine a set of message characteristics based on the selection of the option to enable notifications for specific messages and the notification module may be configured to generate a notification for an incoming message addressed to the recipient based on the set of message characteristics.

16 Claims, 5 Drawing Sheets

Message

Message_ID:
Subject:
From:
To:
CC:
BCC:
Date/Time Sent:
Date/Time Delivered:
Date/Time Opened:
Attachments:
Location:
Thread_ID:
Priority Level:
. . .
Message Content:

METHOD AND SYSTEM FOR PROVIDING NOTIFICATIONS FOR SPECIFIC MESSAGES

BACKGROUND

The present disclosure generally relates to notifications and, in particular, notifications for electronic communications.

Messaging services provide users a means for sending and receiving digital messages. Some services, such as electronic mail (email) services, enable users to be notified when the user receives certain emails. Instead of manually checking the user's email account periodically, the user may set up notifications on an email application on the user's device (e.g., a smart phone or computer) that notify the user each time an email is received. These notifications may come in the form of a sound, a notification message on a display, or a tactile notification (e.g., a vibration). However, due to the large number of messages that users receive of varying degrees of importance, the message notifications may become an annoyance when a user only wants to be notified of particular messages.

SUMMARY

According to one aspect of the subject technology, a system for providing notifications for specific messages addressed to a recipient is provided. The system may include an interface module, a notification rules module, and a notification module. The interface module may be configured to receive a request to enable notifications for a specific type of message addressed to the recipient. The notification rules module may be configured to determine a set of message characteristics based on the request to enable notifications for the specific type of message and the notification module may be configured to receive of an incoming message of the specific type of message and generate a notification for the incoming message based on the set of message characteristics.

According to another aspect of the subject technology, a method for providing notifications for specific messages addressed to a recipient is provided. The method may include receiving a rule to generate notifications for a specific type of message, determining a set of service-defined message characteristics based on the rule to generate notifications for the specific type of message, receiving a message that corresponds to the specific message type, and generating a notification for the received message based on the set of service-defined message characteristics.

According to yet another aspect of the subject technology, a machine-readable medium including instructions stored therein, which when executed by a machine, cause the machine to perform operations for providing notifications for specific messages addressed to a recipient is provided. The operations may include referencing an indication to generate notifications for a specific type of message, determining a set of service-defined message characteristics based on the indication to generate notifications for a specific type of message, receiving an incoming message that corresponds to the specific type of message, and generating a notification for the incoming message based on the set of service-defined message characteristics.

According to another aspect of the subject technology, a method for providing notifications for service-prioritized messages addressed to a user is provided. The method may include identifying a set of characteristics associated with an incoming message addressed to a user, comparing the set of characteristics associated with the incoming message to a set of service-defined characteristics associated with a heightened priority level, and generating a notification for the incoming message if the set of characteristics associated with the incoming message is compatible with the set of service-defined characteristics associated with a heightened priority level.

According to another aspect of the subject technology, a method or providing notifications for messages associated with a particular message thread is provided. The method may include receiving instructions to generate notifications for messages associated with a particular message thread, identifying a thread ID associated with the particular message thread; and generating a notification for an incoming message if a thread ID associated with the incoming message matches the thread ID associated with the particular message thread.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding of the subject technology and are incorporated in and constitute a part of this specification, illustrate disclosed aspects of the subject technology and together with the description serve to explain the principles of the subject technology.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology.

In accordance with various aspects of the subject technology, systems and methods for providing notifications for specific messages are provided. The system may enable a user to select notification options in an messaging application interface that specify which messages will generate notifications and which emails will not. These notifications may come in the form of a sound, a notification message on a display, a tactile notification (e.g., a vibration), a dedicated light indicator, or some other notification means.

Messaging services, such as an email service (e.g., the email application on the user's device or an email server), may help to determine which messages will generate a notification. In one aspect, a user may identify a specific message that has already been received and select a notification option indicating that a notification should be generated for subsequent messages that are related to the identified messages (e.g., subsequent emails belonging to the same thread as an identified email). Based on the selected notification option, the system may determine a set of message characteristics that may be used to identify incoming messages that are related to the identified message. When a subsequent message is received, the messaging service may analyze the message to determine whether the message is related to the identified message based on the characteristics of the subsequent message (e.g., the subject, the sender, the recipients, etc.). If the subsequent message is related (e.g., the subsequent email is in the same thread as the identified email), the system may generate a notification to the user.

Some messaging services may be configured to automatically assign various priority levels (e.g., "important," "not important") to messages sent to a user based on a number of factors. According to one aspect, a user may indicate in an messaging application interface that the user would like to receive notifications for high priority messages or messages above a certain priority. In response to the user indication, the system may be configured to generate notifications for all incoming messages of the appropriate priority level as indicated by the user.

A user may also be able to select other message characteristics that may be used to determine whether a notification should be generated. For example, the user may enable notifications for messages from a particular sender or group of senders, for messages with a particular text string in the subject line, for messages associated with a particular label, or for messages with any other combination of characteristics.

Figure 1:
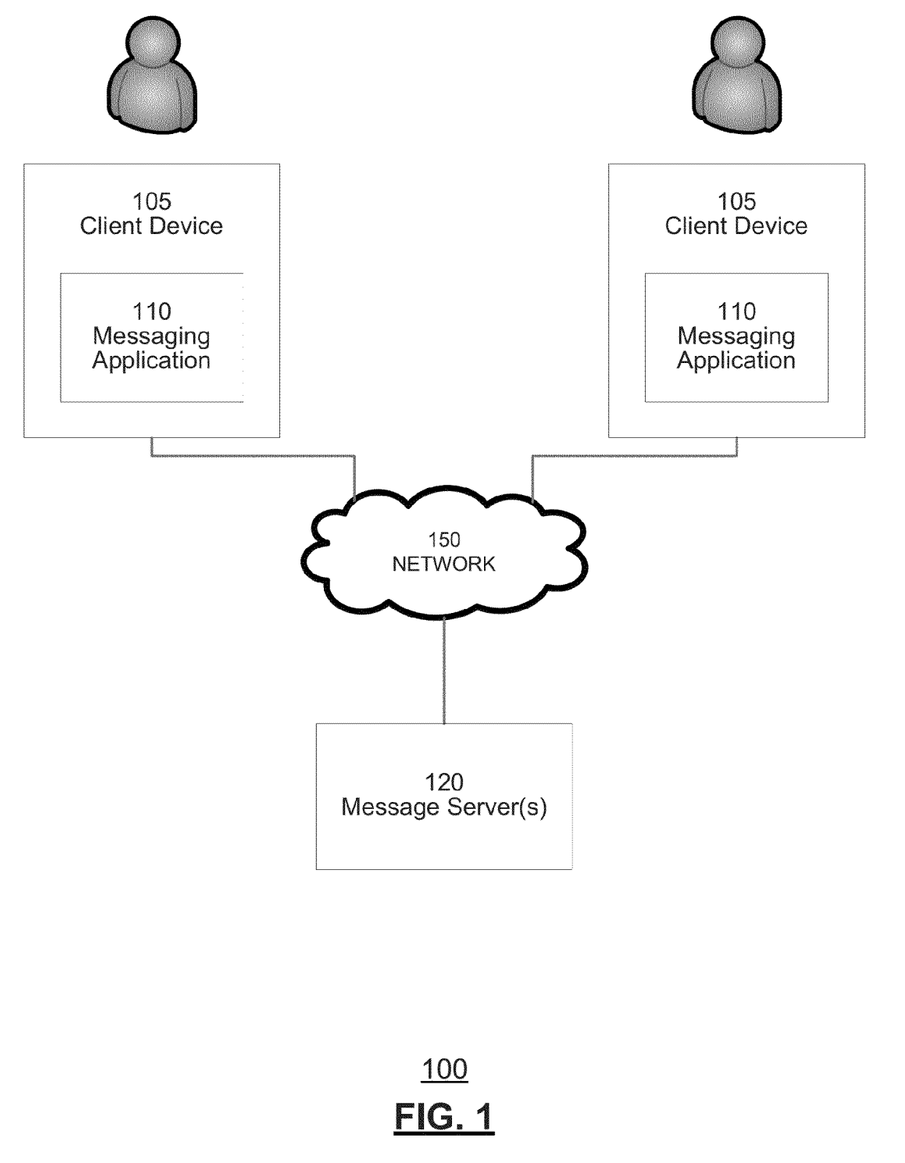
FIG. 1 is a conceptual block diagram illustrating an environment 100 in which a user may be provided with notifications for specific messages, in accordance with various aspects of the subject technology.

FIG. 1 is a conceptual block diagram illustrating an environment 100 in which a user may be provided with notifications for specific messages, in accordance with various aspects of the subject technology. Although FIG. 1 illustrates a client-server network environment 100, other aspects of the subject technology may include other configurations including, for example, peer-to-peer environments. The network environment includes one or more client devices 105 and one or more message servers 120 connected via a network 150 (e.g., the Internet).

The network 150 may include, for example, any one or more of a cellular network, a satellite network, a personal area network (PAN), a local area network (LAN), a wide area network (WAN), a broadband network (BBN), the Internet, and the like. Further, the network 150 can include, but is not limited to, any one or more of the following network topologies, including a bus network, a star network, a ring network, a mesh network, a star-bus network, tree or hierarchical network, and the like.

Each client device 105 may be any machine able to communicate with the message servers 120 via the network 150 and notify a user of an incoming message. For example, client device 105 may be a desktop computer, a laptop, a mobile device (e.g., a smart phone, tablet, personal digital assistant (PDA), etc.), or any other machine with a processor, memory, and communications capabilities.

Each client device 105 may also include a messaging application 110, such as a web browser or an electronic messaging program (e.g., an instant messaging program or a email application). The messaging applications 110 may be configured to enable one user to send and receive messages to and from other users, to notify the user of received messages, and to display messages to the user and allow the user to interact with the messages in a messaging interface.

The message server 120 may be any system or device having a processor, a memory, and communications capability that may be used to receive messages sent from one user to another and route the message to a receiving user. Message processing operations may be performed at the server-side, by the message servers 120, at the client-side, by the messaging program 110, or using a combination of the two.

Figure 2:
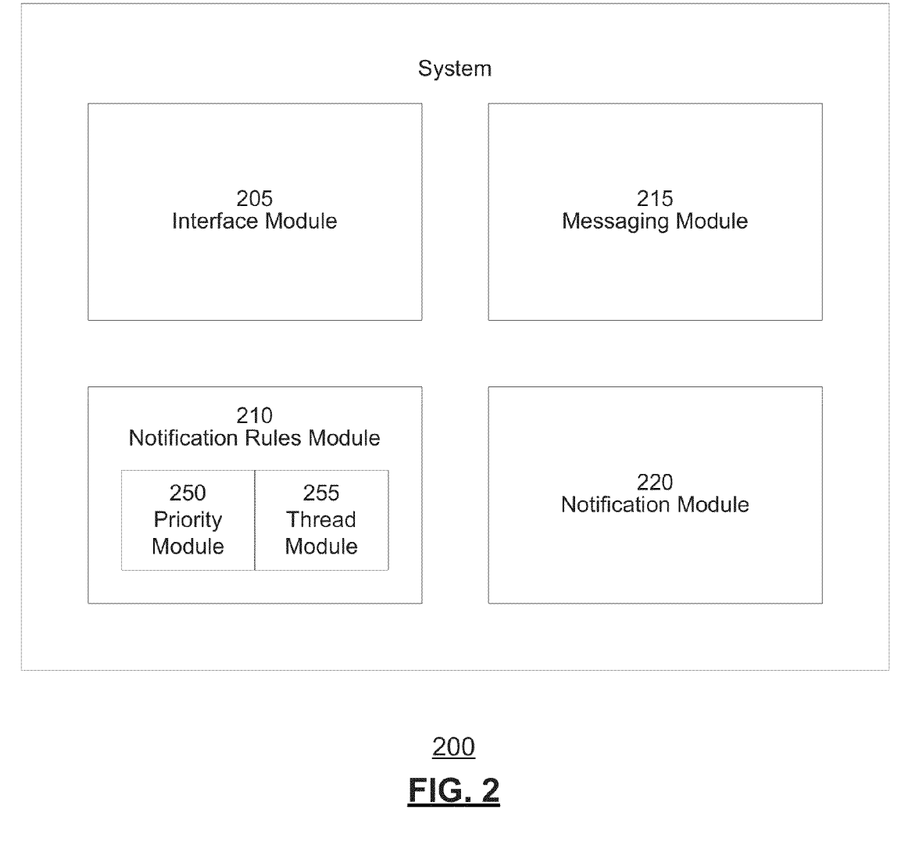
FIG. 2 is a conceptual block diagram illustrating a system configured to provide a user with notifications for specific messages, in accordance with various aspects of the subject technology.

FIG. 2 is a conceptual block diagram illustrating a system 200 configured to provide a user with notifications for specific messages, in accordance with various aspects of the subject technology. The system 205 may include an interface module 205, a notification rules module 210, a messaging module 215, and a notification module 220. The system 205 and the various modules of the system 205 may be located on the client device 105, on the message server 120, or on both.

The interface module 205 may be configured to receive a request from a user for notifications for specific messages or specific types of messages addressed to a recipient. In one aspect, the user may select an option in an application interface of the messaging application 110 that enables notifications of a certain type to be sent to a client device 105. For example, one of the options selected may instruct the system 200 to transmit to the client device 105 notifications for messages (e.g., emails) that have a heightened priority. In another aspect, the user may select an email in an application interface of the messaging application 110 and enable an option to receive notifications for subsequently received emails that belong to the same thread as the selected email.

The notification rules module 210 may be configured to determine a set of service-defined message characteristics that may be used to identify which incoming messages should generate a notification to the client device 105. The notification rules module 210 may include one or more sub-modules that may be used to identify different types of incoming messages. In one aspect, the notification rules module 210 may include, for example, a priority module 250 and a thread module 255. As will be discussed in greater detail below, the priority module 250 may be configured to determine service-defined message characteristics that may be used to identify messages with a heightened priority while the thread module 255 may be configured to determine message characteristics that may be used to identify messages that belong to the same thread as a previously received message.

The messaging module 215 may be configured to receive a number of incoming messages from one user on a sending device to another user on a receiving device. Once a message is received, the notification module 220 may be configured to determine whether the message has characteristics that match one or more of the server-defined message characteristics defined by the notification rules module 210 and, if the message has characteristics that match the server-defined characteristics, the notification module 220 may generate a notification on the receiving device for the message.

Figure 3:
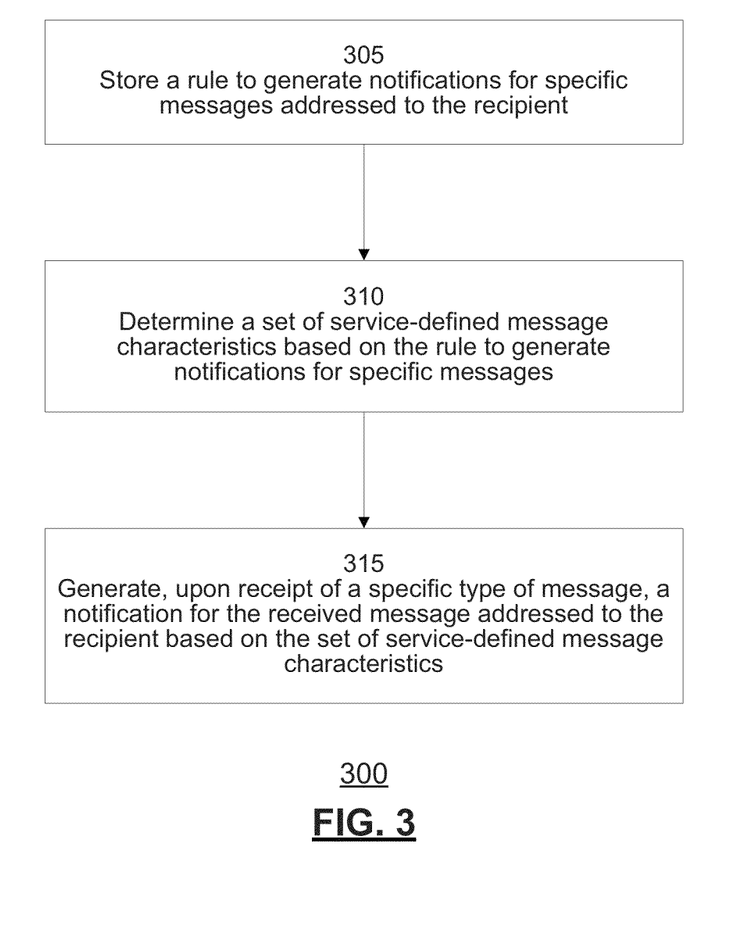
FIG. 3 is a flow chart illustrating a process for providing a user with notifications for specific messages, in accordance with various aspects of the subject technology.

FIG. 3 is a flow chart illustrating a process 300 for providing a user with notifications for specific messages addressed to a recipient, in accordance with various aspects of the subject technology. Although the operations in process 300 are shown in a particular order, certain operations may be performed in different orders or at the same time. The process 300 may begin at operation 305, where the interface module 205 receives a request or instructions to generate notifications for a specific type of message addressed to the recipient. Based on the request, the interface module 205 may store one or more rules to generate notifications for the types of messages addressed to the recipient.

A user may, for example, access a user interface provided by a messaging application (e.g., a web browser or email application) on a client device and enable notifications for one or more types of messages. The user may, for example, select messages (e.g., emails) associated with a specific thread to generate notifications or messages associated with a particular priority level (e.g., messages associated with an "important" label).

Based on the request, the notification rules module 210 may identify a set of service-defined message characteristics at operation 310. The identified characteristics may be based on information contained in the message itself or based on activity associated with a message account of the recipient. An example message displayed in FIG. 4 may help to illustrate how service-defined message characteristics are identified.

Figure 4:
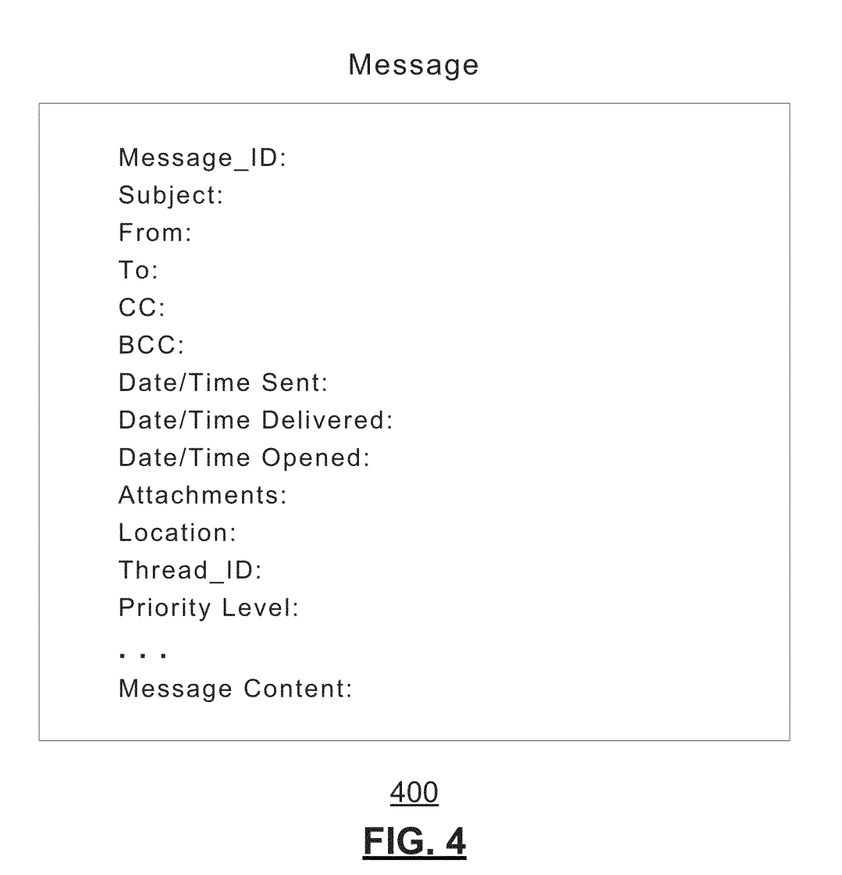
FIG. 4 is a conceptual representation of a message, in accordance with one aspect of the subject technology.

FIG. 4 is a conceptual representation of a message 400 in accordance with one aspect of the subject technology. The message 400 may be associated with several data fields either stored within a message data structure or in an index associated with the message 400. For example, the message 400 may be associated with a message identifier (ID) that may be used to identify the message 400, a subject indicating what the subject is about, one or more senders (e.g., the "From" field), one or more recipients (e.g., the "To," "CC," and "BCC" fields), a time that the message 400 was sent, as well as the content of the message 400. The message 400 may also include an attachment and information regarding the location from which the message 400 was sent.

In some aspects, the message 400 may also include characteristics based on activity associated with the account of a recipient. For example, the message 400 may include information on when the message 400 was delivered to the account of the recipient, if and when the message 400 was opened (e.g., read) by the recipient, and whether the message 400 was labeled by the user, moved into another folder in the recipient's account, deleted, marked as spam, marked as important by the sender or the recipient, etc.

The message 400 may also include a thread ID that may be used to identify the thread the message 400 belongs to and a priority level associated with the message 400. The thread ID and priority level may be calculated and set by the notification rules module 210 (e.g., the priority module 250 and the thread module 255), by one or more modules on the message server 120, or by one or more modules on the client device 105.

The priority level may be calculated based on other message characteristics or activity associated with the recipient's account. For example, a formula taking into account various factors and signals may be used to calculate a score that the priority level is based upon. The factors and signals that may increase the priority score for a message may include whether the message was marked as important by the sender, whether other messages from the same sender were opened, labeled, or marked as important, whether the sender or other recipients of the message may be found in the recipient's contact list, whether the subject or content of the message contains key words, whether the message includes an attachment, etc. Factors and signals that may decrease a priority score may include whether other messages from the same sender were deleted or marked as spam, whether other messages from the same sender were deleted without being opened, etc.

In some aspects, the thread ID associated with a message may be identified based on whether the sender selected an option to "reply" to an base message or an option to "forward" an base message and the thread ID of the base message. In another aspect, the thread ID of a message may be determined based on similarities between characteristics of the message and characteristics of another message associated with the recipient's account. For example, a message may belong to the same thread as another message associated with the recipient's account if the two messages have the same or similar subjects, if the two messages have the same or similar parties to the email (e.g., accounts listed in the "To," "CC," or "BCC" fields), or if the two messages contain similar content or portions of content (e.g., the content of a base message is included in the content of a subsequent message).

Referring back to FIG. 3, after the notification rules module 210 identifies a set of message characteristics that may be used to determine which messages should generate notifications at operation 310, the messaging module 215 may receive incoming messages. The notification module 220 may inspect the incoming messages and determine whether or not to generate a notification based on the set of identified message characteristics. If, for example, the message characteristics identified by the notification rules module 210 match or closely match the message characteristics of an incoming message, the notification module 220 may generate a notification for the incoming message at operation 315. As a result, the recipient may receive a notification on the recipient's client device 105 for specific messages that correspond to server-defined message characteristics based on user instructions rather than all messages.

In another aspect, the user may also specify explicit user-defined message characteristics (e.g., messages from a particular user or group of users) that may be used by the notification module 220 in determining whether a notification for a message should be generated.

Figure 5:
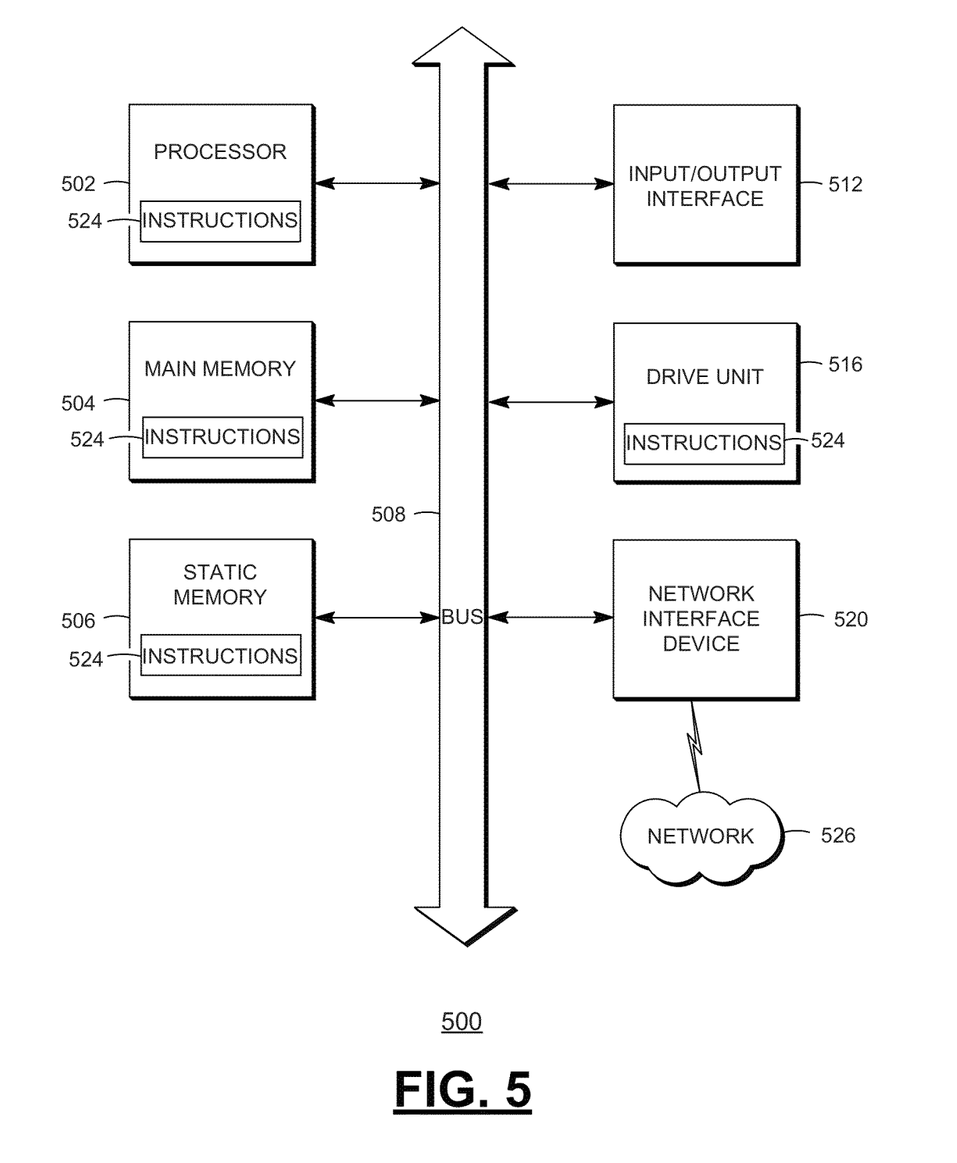
FIG. 5 is a block diagram illustrating an example computer system with which any of the clients and servers of FIG. 1 may be implemented.

FIG. 5 is a block diagram illustrating an example computer system with which any of the clients and servers of FIG. 1 may be implemented. In certain aspects, the computer system 500 may be implemented using hardware or a combination of software and hardware, either in a dedicated server, or integrated into another entity, or distributed across multiple entities.

The example computer system 500 includes a processor 502, a main memory 504, a static memory 506, a disk drive unit 516, and a network interface device 520 which communicate with each other via a bus 508. The computer system 500 may further include an input/output interface 512 that may be configured to communicate with various input/output devices such as video display units (e.g., liquid crystal (LCD) displays, cathode ray tubes (CRTs), or touch screens), an alphanumeric input device (e.g., a keyboard), a cursor control device (e.g., a mouse), or a signal generation device (e.g., a speaker).

Processor 502 may be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

A machine-readable medium (also referred to as a computer-readable medium) may store one or more sets of instructions 524 embodying any one or more of the methodologies or functions described herein. The instructions 524 may also reside, completely or at least partially, within the main memory 504 and/or within the processor 502 during execution thereof by the computer system 500, with the main memory 504 and the processor 502 also constituting machine-readable media. The instructions 524 may further be transmitted or received over a network 526 via the network interface device 520.

The machine-readable medium may be a single medium or multiple media (e.g., a centralized or distributed database, and/or associated caches and servers) that store the one or more sets of instructions. The machine-readable medium may include the drive unit 516, the static memory 506, the main memory 504, the processor 502, an external memory connected to the input/output interface 512, or some other memory. The term "machine-readable medium" shall also be taken to include any non-transitory medium that is capable of storing, encoding or carrying a set of instructions for execution by the machine and that cause the machine to perform any one or more of the methodologies of the embodiments discussed herein. The term "machine-readable medium" shall accordingly be taken to include, but not be limited to, storage mediums such as solid-state memories, optical media, and magnetic media.

Systems, methods, and machine-readable media for providing notifications for specific messages (e.g., emails) addressed to a recipient is provided. The system may include an interface module, a notification rules module, and a notification module. The interface module may be configured to receive a selection of an option that enables notifications for specific messages addressed to the recipient. The notification rules module may be configured to determine a set of message characteristics based on the selection of the option to enable notifications for specific messages and the notification module may be configured to generate a notification for an incoming message addressed to the recipient based on the set of message characteristics.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa.

A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

The word "exemplary" may be used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A method for providing notifications for a specific type of message addressed to a recipient, the method comprising:
   receiving an identification of a previously received message, the message comprising a target thread ID;
   receiving an indication to generate notifications for messages associated with the target thread ID;
   determining a set of service-defined message characteristics based on the indication, wherein the service-defined message characteristics are based on the target thread ID;
   receiving a plurality of messages addressed to the recipient;
   obtaining a thread ID for each of the received plurality of messages;

selecting at least one message from the plurality of messages that match the service-defined message characteristics, wherein the obtained thread ID for the at least one message matches the target thread ID;
generating a notification for the at least one selected message; and
calculating the thread ID for each of the received plurality of messages, the calculating comprising:
determining, for each unidentified message, whether the unidentified message is a reply or forward of another message;
when it is determined that the unidentified message is the reply or the forward of the another message, obtaining a thread ID of the another message; and
associating the thread ID of the another message with the thread ID of the unidentified message.

2. The method of claim 1, further comprising generating notifications for messages associated with a particular priority level.

3. The method of claim 1, wherein the set of service-defined message characteristics are based on activity in a message account of the recipient.

4. The method of claim 1, wherein the set of service-defined message characteristics include characteristics of a previously received message addressed to the recipient.

5. The method of claim 1, wherein the set of service-defined message characteristics include a particular priority level.

6. The method of claim 1, further comprising transmitting the notification to a client device.

7. The method of claim 1, wherein the notification for the at least one selected message is generated based on client-defined message characteristics and the service-defined message characteristics.

8. The method of claim 1, wherein the incoming message is an email addressed to a recipient.

9. A system for providing notifications for a specific type of message addressed to a recipient, the system comprising:
one or more processors; and
a machine-readable medium encoded with instructions executable by the one or more processors, the instructions comprising:
an interface module configured to receive an identification of a previously received message, the message comprising a target thread ID; and to receive a request to enable notifications for messages associated with the target thread ID; and
a notification rules module configured to determine a set of message characteristics based on the request to enable notifications for the messages associated with the target thread ID; and
a notification module configured to:
receive a plurality of incoming messages,
select at least one message from the plurality of incoming messages that match the service-defined message characteristics,
generate a notification for the at least one selected message,
calculate the thread ID for each of the received plurality of messages, the calculating comprising:
determining, for each unidentified message, whether the unidentified message is a reply or forward of another message,
when it is determined that the unidentified message is the reply or the forward of the another message, obtaining a thread ID of the another message,
associating the thread ID of the another message with the thread ID of the unidentified message; and
a thread module configured to obtain a thread ID associated with the incoming message, and wherein the notification for the at least one selected message is generated if the thread ID associated with the incoming message matches the target thread ID.

10. The system of claim 9, wherein the interface module is further configured to receive a request to enable notifications for messages associated with a heightened priority level, and wherein the set of message characteristics is further based on the request to enable notifications for messages associated with the heightened priority level.

11. The system of claim 10, further comprising a priority module configured to determine a priority level associated with the incoming message based on activity in a message account of the recipient, and wherein the notification for the at least one selected message is generated if the priority level associated with the incoming message matches the heightened priority level included in the set of message characteristics.

12. A non-transitory machine-readable medium comprising instructions stored therein, which when executed by a machine, cause the machine to perform operations comprising:
referencing an identification of a previously received message, the message comprising a target thread ID;
referencing an indication to generate notifications for messages associated with the target thread ID;
determining a set of service-defined message characteristics based on the indication to generate notifications for messages associated with the target thread ID;
receiving a plurality of incoming messages;
obtaining a thread ID for each of the received plurality of incoming messages;
selecting at least one message from the plurality of incoming messages that match the service-defined message characteristics;
generating a notification for the at least one selected message; and
calculating the thread ID for each of the received plurality of messages, the calculating comprising:
determining, for each unidentified message, whether the unidentified message is a reply or forward of another message;
when it is determined that the unidentified message is the reply or the forward of the another message, obtaining a thread ID of the another message;
associating the thread ID of the another message with the thread ID of the unidentified message.

13. The non-transitory machine-readable medium of claim 12, further comprising generating notifications for messages associated with a particular priority level.

14. The non-transitory machine-readable medium of claim 12, wherein the set of service-defined message characteristics are based on activity in a message account of the recipient.

15. The non-transitory machine-readable medium of claim 12, wherein the incoming message is an email.

16. A method for providing notifications for messages associated with a particular message thread, the method comprising:
receiving an identification of a particular message thread, wherein the particular message thread is a previously received message;
receiving a request to generate notifications for messages associated with the particular message thread;

identifying a target thread ID associated with the particular message thread;

determining a set of service-defined message characteristics based on the request, wherein the service-defined message characteristics are based on the target thread ID;

receiving a plurality of messages;

obtaining a thread ID for each of the received plurality of messages;

selecting at least one message from the plurality of messages that match the service-defined message characteristics, wherein the obtained thread ID for the at least one message matches the target thread ID;

generating a notification for the at least one selected message; and calculating the thread ID for each of the plurality of incoming messages, the calculating comprising:
   determining, for each unidentified incoming message, whether the unidentified message is a reply or forward of another message;
   when it is determined that the unidentified message is the reply or the forward of the another message, obtaining a thread ID of the another message;
   associating the thread ID of the another message with the thread ID of the unidentified incoming message.

* * * * *